United States Patent [19]

Berndtson

[11] Patent Number: 5,201,237
[45] Date of Patent: Apr. 13, 1993

[54] SHIFT FORK FOR A VEHICULAR TRANSMISSION

[75] Inventor: John J. Berndtson, St. Clair Shores, Mich.

[73] Assignee: Saturn Corporation, Troy, Mich.

[21] Appl. No.: 588,400

[22] Filed: Sep. 26, 1990

[51] Int. Cl.⁵ .................... G05G 3/00; F16D 13/58
[52] U.S. Cl. .................... 74/473 R; 192/82 R
[58] Field of Search .................... 74/473 R; 192/82 R

[56] References Cited

U.S. PATENT DOCUMENTS

| | | | |
|---|---|---|---|
| 3,915,027 | 10/1975 | Simmons et al. | 192/82 R X |
| 4,238,012 | 12/1980 | Takiguchi et al. | 192/82 R X |
| 4,315,698 | 2/1982 | Takahashi et al. | 192/82 R X |
| 4,353,449 | 10/1982 | Lamy et al. | 192/82 R |
| 4,495,831 | 1/1985 | Takahashi et al. | 192/82 R X |
| 4,529,080 | 7/1985 | Dolan | 192/82 R X |
| 4,531,623 | 7/1985 | Arai et al. | 192/82 R |

FOREIGN PATENT DOCUMENTS

| | | | |
|---|---|---|---|
| 56-16218 | 2/1981 | Japan | 192/82 R |
| 59-218522 | 12/1984 | Japan | 192/82 R |
| 59-229631 | 12/1984 | Japan | 192/82 R |

Primary Examiner—Allan D. Herrmann
Attorney, Agent, or Firm—Donald F. Scherer

[57] ABSTRACT

The present invention relates to a shift fork (10) for a vehicular transmission. The shift fork (10) utilizes a hub portion (12) from which an offset arm (16) extends radially outwardly to terminate in an outer end portion (18). One or more contact pads (22 and 44) are supported from the outer end portion (18) of the offset arm (16), and the tines (20) extending from the offset arm (16). The contact pads (22 and 44) present longitudinally facing wear surfaces (24 and 46). Each of the longitudinally oriented wear surfaces (24 and 46) has an angularly inclined portion (32 and 48). The inclined portions (32 and 48) each diverge outwardly at an angle (phi or theta) which equals the angle at which the offset arm (16), or each tine (20), deflects at the location along the contact pads (22 and/or 44) where each wear surface (24 and/or 46) is subjected to a predetermined load.

15 Claims, 2 Drawing Sheets

SHIFT FORK FOR A VEHICULAR TRANSMISSION

TECHNICAL FIELD

The present invention relates to vehicular transmissions. More particularly, the present invention relates to the movable shift forks that are incorporated in vehicular transmissions selectively to translate the coupling sleeves in shift gears directly, in order to effect selection of the desired gear ratio. Specifically, the present invention is directed to an improved configuration for the contact pads or shoes which are utilized in conjunction with such shift forks and which may conveniently be fabricated as an integral part of the shift fork.

BACKGROUND OF THE INVENTION

Selectively movable shift forks are employed in vehicular transmissions to translate the means employed therein to select the desired gear ratio between the engine and the drive wheels of the vehicle. The present invention is directed to an improved configuration for shift forks, and particularly the contact pads or shoes presented from the shift fork, to engage whatever members are utilized within the transmission to effect selection of the desired gear ratio. However, before proceeding to describe the invention itself, it may be helpful to provide a brief overview of the environment within which the invention is to be employed. This can begin with a brief description of a representative vehicular transmission.

A transmission is incorporated in a vehicular drive train between the engine and the drive wheels to provide a plurality of gear ratios for moving forwardly, and generally one gear ratio for moving rearwardly. The transmission is a necessary part of a vehicular drive train, because internal combustion engines can deliver only limited torque at low revolutions per minute (RPM). The transmission allows the speed of the engine to be maintained within its optimum operating range for the delivery of maximum torque or power as the vehicle accelerates from a stationary or "stopped" position to the desired speed. The speed reduction between the RPM of the engine and the resulting rotation of the drive wheels provided by a transmission effects a controlled application of the torque by which the drive wheels are rotated. Accordingly, when that gear ratio, commonly designated as "low" or "first" gear, is selected, the transmission imparts less speed to the drive wheels, but imparts more torque from the engine to rotate the drive wheels in order to overcome the static inertia of the vehicle and thereby initiate forward movement. As the speed of the vehicle increases, the transmission may be selectively shifted through the plurality of gear ratios provided by the transmission in order to impart progressively greater rotational speed to the drive wheels with concomitantly lesser torque.

Many manual transmissions provide three forward gear ratios. These transmissions are generally identified as "three-speed" transmissions, but "four-speed" and "five-speed" transmissions are also quite common, because they permit an engine to operate within a smaller, optimal speed range, while effecting progressively increasing forward speed to the vehicle. Irrespective of the exact number of gear ratios provided, manual transmissions offer a plurality of forward speed gear ratios from which the driver may make the desired selection—though normally the selection is sequential—to transmit torque from the engine to the drive wheels. Generally, only a single reverse gear ratio is provided.

In a typical three-speed transmission there is generally an input shaft which is operatively rotated by the engine of the vehicle. The input shaft generally has a clutch gear or synchronizer assembly connected thereto so that rotation of the input shaft always rotates a portion of the clutch gear.

The transmission also has an output or transmission shaft which is operatively connected to the drive wheels of the vehicle, as through a differential. In a representative three-speed manual transmission there are generally two gears which are operatively carried by the output shaft to provide a means by which to rotate the output shaft. The driving connection between the two gears and the output shaft is quite often achieved by a spline connection, so that the gears may be selectively translated axially along the output shaft while maintaining a constant rotational driving connection therewith. The two gears so supported on the output shaft are also of preferably different diameters.

The representative transmission also has a countershaft upon which a number of gears are operatively supported. One of those gears is normally affixed to the countershaft and constantly meshed with the clutch gear in order to effect rotation of the countershaft in response to rotation of the input shaft.

In the representative three-speed transmission being discussed, each of the two gears on the output shaft interact with a shift fork—a bracket that is movable to effect selective engagement or disengagement between those gears, and one or the other of the gears on the countershaft.

In low gear, the larger of the two gears on the output shaft is operatively engaged with the smaller gear on the countershaft. When the engine approaches the upper limit of its operating range, the driver can shift into the second gear ratio by manipulating a shift fork to engage the smaller diameter gear on the output shaft with the larger gear on the countershaft. For cruising speed, the driver shifts into the third gear ratio. This may be accomplished by using a shift fork to force the smaller of the gears on the output shaft axially into engagement with the clutch gear. To select reverse gear, a small gear on an idler shaft is interposed between a gear on the countershaft with a gear on the output shaft, again by movement of an appropriate shift fork.

In some transmissions the gears are not fixed to the shaft on which they are carried. In those installations, the shift fork translates a member—such as the coupling collar typically employed in a shift synchronizer—selectively into and out of engagement with a gear that otherwise rotates freely on its supporting shaft. Engagement of the coupling sleeve with the gear secures the gear to the shaft on which the gear is rotatably supported so that they rotate in unison. Such a transmission generally employs multiple shift rails mounted within the transmission casing for axial translation. The shift rails support the necessary shift forks, which selectively translate the coupling collar in the appropriate shift synchronizer to effect a driving connection between the gear and the shaft on which it is carried—usually either the countershaft or the output shaft.

Irrespective of how the gears are connected to their supporting shafts, contact surfaces on the shift fork are slidably received within an annular groove or race provided in the member to be translated, be it the gear or the coupling collar. The shift fork is, itself, supported by a hub portion. The hub portion may be slidably received on a mounting shaft; it may be secured to an axially translatable shift rail; or, it may be pivotally mounted on a support shaft. Irrespective of how the hub portion is supported, an offset arm extends radially outwardly from the hub portion, and the outer end portion of the offset arm may be bifurcated into two, divergent arms or tines which embrace the race in the gear or coupling collar to be translated by that shift fork.

In the vast majority of manual transmissions, when the driver operates a shift lever to effect a change in the gear ratio, the movement of the shift lever is communicated to a shift fork that is utilized to engage or disengage the necessary gears, either with each other or with the shafts on which they are carried. As such, it is commonly thought that the shift fork must be sufficiently rigid to overcome the resistance offered by the interaction of those components within the transmission which effect selection of the gear ratio. This conclusion has been empirically determined on the basis that deflection of the prior art shift forks has produced deleterious results. Specifically, deflection of a prior art shift fork can: (1) cause the coupling collar to "cock" on its shaft; (2) cause the independently mounted contact pads interposed between the shift fork and the element engaged thereby to "cock"; and/or (3) cause the contact pads of prior known configuration to wipe away the protective lubricant interposed between each contact pad and the transmission which it engages.

Shift forks are made from a wide variety of materials to accomplish the desired design parameters. As should now be apparent, the principal design parameters have heretofore been that the hub and offset arm portions of the shift fork should resist the bending stresses to which they are typically exposed. At the same time, the ends of the bifurcated tines which come into contact with the race, in either the gears themselves or coupling collars, must have a low coefficient of friction and yet good resistance to wear.

Shift forks have been made by casting a copper-aluminum alloy which makes it possible not only to impart the desired frictional characteristics to the ends of the shift fork, but also provide the necessary structural resistance heretofore deemed to be required. The use of brass offers the same advantages. However, these materials are quite heavy, and they are relatively expensive. Moreover, the mass of material required to impart the desired strength not only increases the weight of the shift fork, but also increases the size thereof, so that they become a significant factor in designing the transmission housing. Shift forks made from cast iron or steel can certainly provide the desired rigidity, but prior known designs for the shift forks have led to the conclusion that such materials cause degradation of the shift forks themselves or of the race with which the shift fork interacts. It has, therefore, been necessary to provide some metallurgical treatment to the shift forks in order to obviate frictional wear and degradation. Alternatively, it has heretofore been suggested that the use of separate wear inserts could accomplish the desired wear resistance. The use of separate contact pads does make it possible to fabricate the shift fork itself out of a stress resistant material and yet make the contact pad out of a wholly distinct material which has the requisite wear and friction characteristics. However, even though it has been recognized that the use of separate contact pads can be beneficial, it has not been appreciated that the planar or arcuate configurations heretofore employed tend to wipe away the lubricant if the shift fork is not sufficiently rigid to preclude deflection under the anticipated loading.

As such, it has not previously been thought possible to lighten the shift fork and allow it to deflect under the forces to which it is commonly subjected in a transmission, and at the same time rely upon the configuration of the contact pad to accommodate the deflection and thereby avoid the operational degradation heretofore experienced when the shift fork has been inadvertently permitted to deflect.

SUMMARY OF THE INVENTION

It is, therefore, a primary object of the present invention to provide a shift fork for a vehicular transmission, the shift fork having reduced mass to effect economic savings of materials and a concomitant reduction in the space required within the transmission housing to receive the shift fork.

It is another object of the present invention to provide a shift fork, as above, that employs contact pads which can tolerate relatively large axial loading, even though the loading significantly deflects the shift fork, but without the customarily attendant degradation or mechanical binding of the components previously experienced when the shift fork was permitted to deflect.

It is a further object of the present invention to provide a shift fork, as above, whereby the contact pads may be integrally formed with the shift fork in such a unique configuration that materials heretofore deemed to be operationally degrading to the elements contacted thereby can be employed.

It is also an object of the present invention to provide a shift fork, as above, that is economical to manufacture and use.

It is yet another object of the present invention to provide a method whereby to determine the most appropriate configuration for the contact pad to accommodate the anticipated loading.

These and other objects of the invention, as well as the advantages thereof over existing and prior art forms, which will be apparent in view of the following detailed specification, are accomplished by means hereinafter described and claimed.

In general, a shift fork for a vehicular transmission embodying the concepts of the present invention is supported by a hub portion, and an offset arm extends radially outwardly from the hub portion. Spaced radially outwardly from the hub portion, the offset arm terminates in an outer end portion. Contact pad means are supported from the outer end portion of the offset arm, and the contact pad means present longitudinally facing wear surfaces. Each of the longitudinally oriented wear surfaces has a radially extending, angularly inclined, planar portion.

The planar portion diverges outwardly at an angle which equals the angle at which the offset arm deflects at the location of the contact pad means when the contact pad is subjected to a predetermined load.

The improved shift fork, to which the present invention is directed, is described in conjunction with integral contact pads. The exemplary embodiment so disclosed being deemed sufficient to effect a full disclosure of the subject invention. The exemplary shift fork is described in detail without attempting to show all of the various forms and modifications in which the invention might be embodied; the invention being measured by the appended claims and not by the details of the specification.

DESCRIPTION OF AN EXEMPLARY EMBODIMENT

Figure 1:
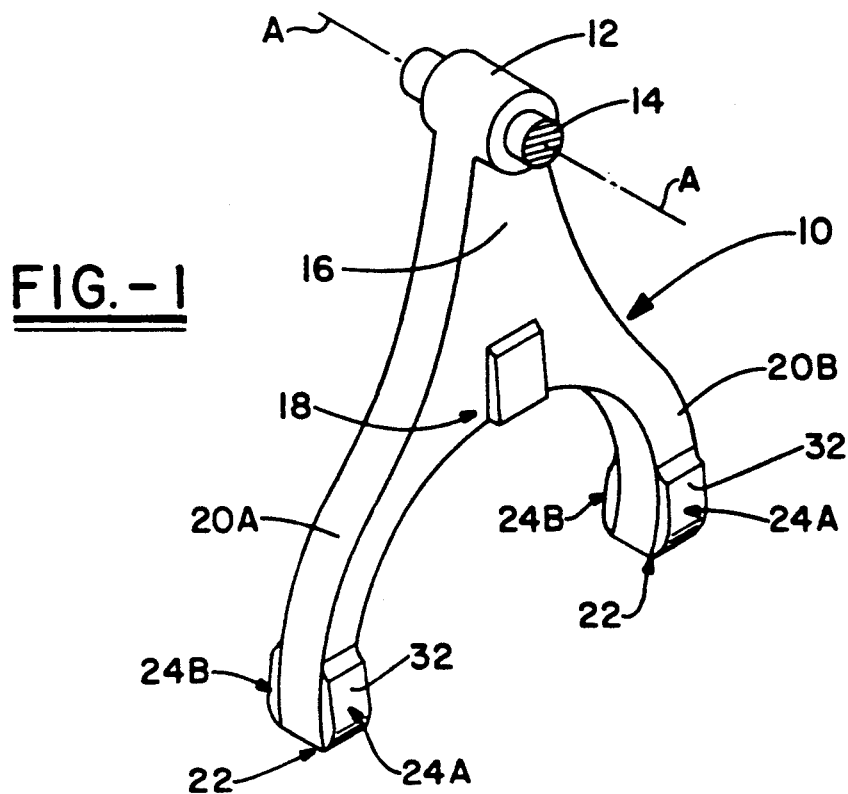
FIG. 1 is a frontal perspective of a shift fork embodying the concepts of the present invention.

An improved shift fork assembly embodying the concepts of the present invention is identified by the numeral 10 on the accompanying drawings. With initial reference to FIGS. 1 and 2, the representative shift fork 10 is supported by a hub portion 12. The hub portion 12 may be slidably received on a supporting member 14, in which situation, an additional structural element (not shown) will be included on the shift fork 10, as is well known to the art, for connection to the link mechanism by which the shift fork 10 may be translated along the longitudinally axis "A" of the supporting member 14. It is also quite common to secure the hub portion 12 to the supporting member 14 and effect translation of the supporting member 14 itself along longitudinal axis "A" and thereby translate the shift fork 10. When the hub portion is fixed to the supporting member 14, the supporting member 14 is commonly designated as a shift rail.

An offset arm 16 is oriented perpendicularly to the longitudinal axis "A" and extends radially outwardly from the hub portion 12 to terminate in an outer end portion 18. The offset arm has a plane of symmetry 17 that is disposed perpendicularly to the longitudinal axis "A". Typically, the outer end portion 18 is bifurcated to present a pair of opposingly disposed tines 20A and 20B, respectively, which curve outwardly from the outer end portion 18 to be transversely spaced with respect to the plane of symmetry 17.

As may be apparent from the previous paragraph, and as utilized in the detailed description which follows, a particular structural member, component or arrangement, may be duplicated within the structure of the invention. When referring generally to that type of structural member, component or arrangement, a common numerical designation shall be employed. However, when one of the structural members, components or arrangements so identified is to be individually identified, it shall be referenced by virtue of a letter suffix employed in combination with the numerical designation employed for general identification of that structural member, component or arrangement. Thus, there are tines which are generally identified by the numeral 20, but the specific individual tines are, therefore, identified as 20A and 20B in the specification and on the drawings. This same suffix convention shall be employed throughout the specification.

Each tine 20 terminates in a contact pad portion 22 which may effectively be formed integrally therewith, or contact pads of the same configuration may be separate and distinct elements that are demountably secured to the tines 20. In either event, the contact pads 22 preferably project longitudinally outwardly (parallel to the longitudinal axis "A") from the tines 20 to provide longitudinally facing wear surfaces 24. Each wear surface 24 has an inclined portion more fully hereinafter described.

Figure 2:
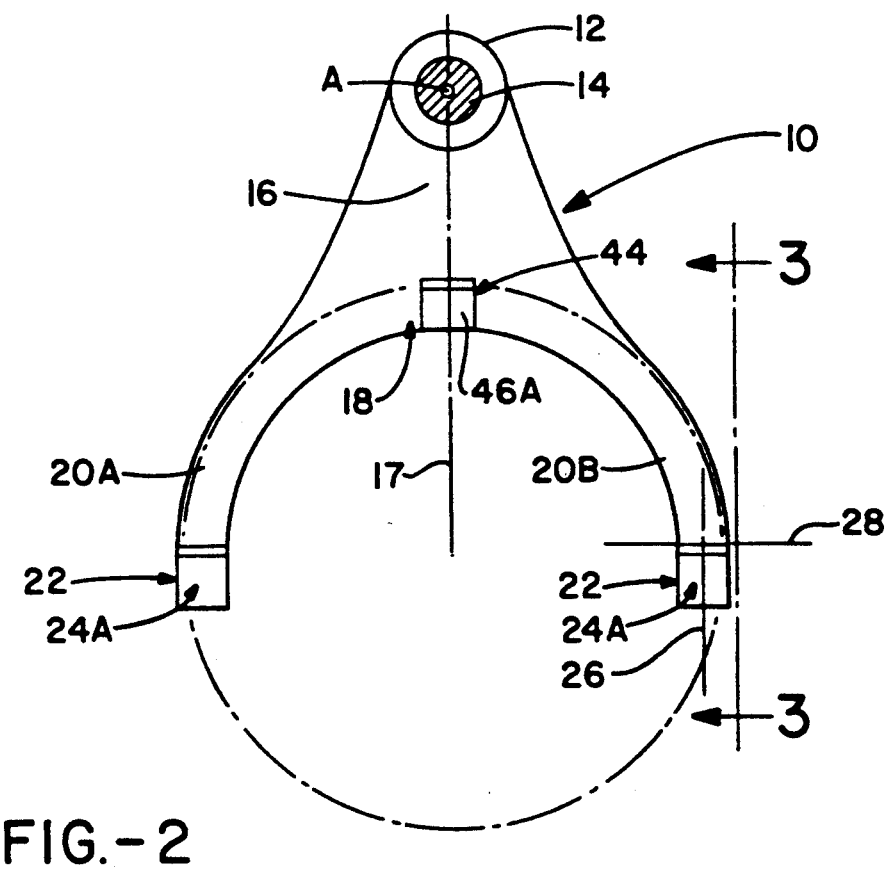
FIG. 2 is an elevational view of the shift fork shown in FIG. 1 and depicted in conjunction with the phantom or chain line representation of a race in the member to be longitudinally translated by the shift fork.

To expand upon the configuration of the contact pads 22, each has a sagittal or longitudinal plane 26 (as viewed in FIG. 2) and two reference planes 28 and 30 which are disposed orthogonally with respect to the sagittal plane 26. The first reference plane 28 (also as represented in FIG. 2) is disposed transversely with respect to the tine 20 and defines the junction of the tine 20 with the contact pad 22 presented therefrom. The second reference plane 30 (as represented in FIG. 4) is disposed perpendicularly with respect to the sagittal plane 26 and medial of the tine 20.

Figure 3:
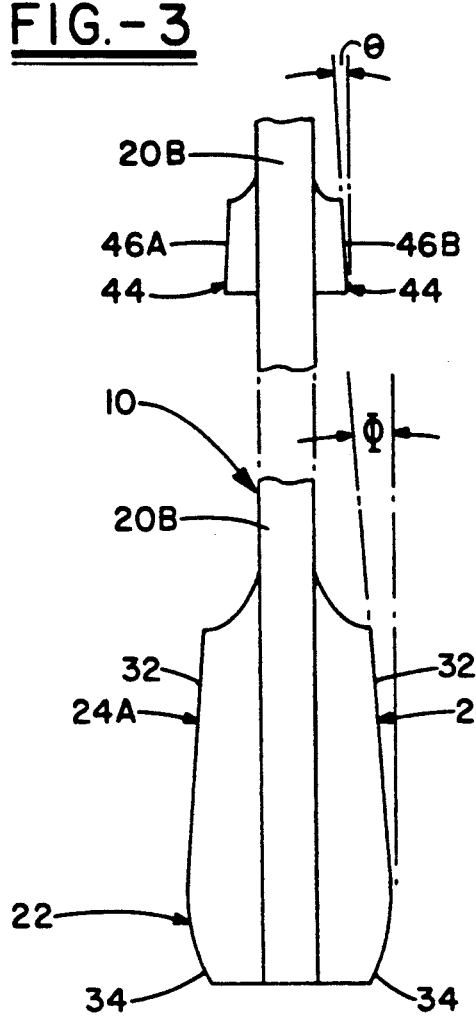
FIG. 3 is an enlarged side elevation taken substantially along line 3—3 of FIG. 2.
Figure 4:
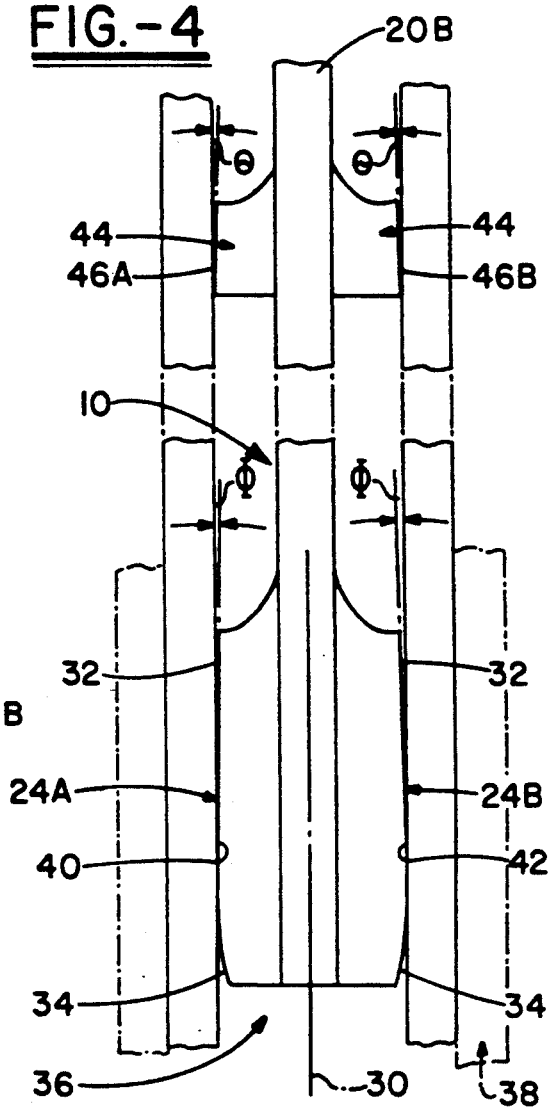
FIG. 4 is a view similar to FIG. 3 but depicting the shift fork as it engages the race of a member to be translated by the shift fork.

Each wear surface 24 has a longitudinally facing, radially extending, angularly inclined, planar portion 32 which diverges outwardly at an angle identified as phi in FIGS. 3 and 4 of the accompanying drawings. The radially outermost extent of the planar portion 32 merges tangentially with a curvilinear portion 34, and the curvilinear portion 34 is preferably arcuate, as depicted. The means by which to determine the numerical value of phi will be hereinafter more fully explained, but for the present, it should be noted that the side elevation represented in FIG. 4 depicts the tine 20B as it is received in the race 36 of a coupling collar 38. The oppositely directed surfaces 24A and 24B on the contact pads 22 cooperatively interact with the side walls 40 and 42 of the race 36, as will be hereinafter more fully explained.

A third contact pad 44 is presented at the juncture of the outer portion 18 of the offset arm 16 with the tines 20, as shown in FIGS. 1 and 2. The third contact pad 44 may also be formed integrally with the remainder of the shift fork 10, or it may be a separate and distinct element that is demountably attached to the outer portion 18 of the offset arm 16. The third contact pad 44 also projects longitudinally outwardly with respect to the offset arm 16, and each contact pad 44 provides a longitudinally facing wear surface 46. The wear surface 46 is radially extending, and angularly inclined, such that it diverges outwardly at an angle identified as theta on FIGS. 3 and 4 of the accompanying drawings. The method by which to determine the angular values for theta and phi will now also be more fully explained.

Figure 5:
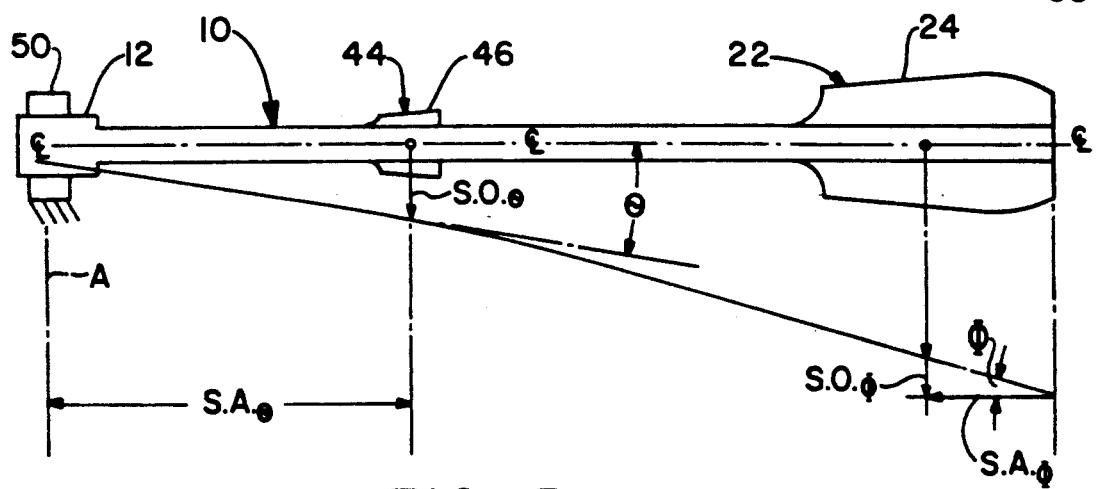
FIG. 5 is a schematic representation of a shift fork embodying the concepts of the present invention subjected to deflection by a predetermined loading visually to depict how the angular inclination of the wear surfaces on the contact pads is determined.

The angular inclination of the planar portions 32 of the wear surfaces 24 on the contact pads 22A and 22B, as well as the planar wear surface 46 on the third contact pad 44, can be conveniently and accurately determined by the following method. The hub portion 12 of the shift fork 10 is secured within a vise-like device 50, as depicted schematically in FIG. 5. The shift fork 10 is secured within the device 50 fixedly to position the axis "A" of the hub portion 12.

Based upon an evaluation of the link mechanism by which the shift fork 10 is operatively connected to a shift lever (not shown) in the environment within which the shift fork 10 is to be employed—taken in consideration of the anticipated force applied to the shift lever during a shift operation—one can reasonably estimate a representative loading that would be applied to the wear surfaces 24 and 44. For example, a representative loading on the wear surfaces might well total approximately 60 pounds. In the embodiment of the shift fork 10 described, that would amount to the application of 20 pounds to each of the two wear surface 24 as well as to the third wear surface 46.

The representative shift fork 10 might well have a moment arm that extends from the axis "A" of the hub portion 12 to the center of the planar portions 46 on the contact pads 46. Under the application of the aforesaid loading, one can measure the deflection of the wear surfaces 46. With a representative shift fork 10 embodying the concepts of the present invention, the contact pads 44 will have deflected 0.234 mm. Once the shift fork 10 has deflected, one must determine the length of the moment arm as it is projected upon the location where the second of the reference planes 30 had been prior to the deflection of the shift fork 10. This projected length of the offset arm 18 is considered the side adjacent "S.A." (theta) as marked on FIG. 5. Using comparable geometric terminology, the deflection is preferably the side opposite "S.O." (theta). Knowing the projected length of the offset arm, which measures 21.6 mm, and the deflection, one can calculate, for example, the angle of inclination theta of the wear surfaces 46, in the following manner:

$$\tan \theta = \frac{\text{deflection } (S.O.)}{\text{projected length } (S.A.)}$$

Substituting the appropriate values:

$$\tan \theta = \frac{0.234}{21.6} = 0.010833$$

Therefore:

$$\theta = 37.24' \ (0.62°)$$

One can also determine the desired angle of inclination phi for the wear surfaces 24 on the contact pads 22 when the shift fork 10 is subjected to a predetermined load, but for this calculation one should address the deflection at the end portion of the tines 20 rather than perform the geometric calculations on the basis of the dimensions for the entire shift fork 10 and the overall deflection of the contact pads 22. The decision to focus on the outer end portion of the tines 20 is made because the loading applied to the shift fork causes it to bend to varying degrees along its overall length. As such, a short incremental length of the shift fork 20, such as the end portions of the tines 20, can be considered to deflect relatively linearly. Accordingly, one may consider that the end of each tine 20 (which have deflected 0.754 mm under the aforesaid loading) defines the vertex of a triangle that may be considered when calculating the angle of inclination phi for the planar wear surfaces 24. On that basis one can then determine that the midpoint of each contact pad 22 (the point at which the load can be deemed to be concentrated) deflects 0.6495 mm under the aforesaid loading. Inasmuch as the contact pads 22 extend along the tines 20 for approximately 15.91 mm in the representative shift fork 10 described herein, one can establish a triangle wherein the side of the triangle adjacent the angle phi—i.e.: "S.A." (phi) to be calculated has a projected length of approximately 7.95 mm, and the side opposite "S.O." (phi) is equal to the difference between the total deflection at the apex of the triangle and the deflection at the midpoint of the contact pad 22, which under the aforesaid loading is measured to be 0.1045 mm. The calculations for determining the magnitude of angle phi may, therefore, be accomplished as follows:

$$\tan \Phi = \frac{\text{side opposite}}{\text{side adjacent}}$$

Substituting the appropriate values:

$$\tan \Phi = \frac{.1045}{7.95} = .01314$$

Therefore:

$$\Phi = 45.172' \ (0.75°)$$

In view of the foregoing explanation as to the determination of the deflection angles theta and phi for a specific shift fork 10 when subjected to a predetermined loading, it should now be understood that the tangent of each angle is approximately equal to the deflection of the wear surface under consideration divided by the projected length of the offset arm through which the specific deflection is achieved. As such, the terms "side adjacent" and "side opposite" are particularly apposite.

As such, the present invention teaches that a shift fork embodying the concepts of the present invention may not only have reduced mass and therefore be subject to deflection, although without the attendant degradation and binding inherent to prior art shift forks, but also accomplish the other objects of the invention.

The embodiments of the invention is which an exclusive property or privilege is claimed are defined as follows:

1. A shift fork for a vehicular transmission, said shift fork comprising: a hub portion having a longitudinal axis; an offset arm oriented perpendicularly with respect to said longitudinal axis being connected with and extending radially outwardly from said hub portion to terminate in an outer end portion; contact pad means presented from said outer end portion of said offset arm to provide longitudinally facing wear surfaces; and, each of said longitudinally facing wear surfaces including an angularly inclined portion extending radially with respect to the longitudinal axis, and the inclined portion of said wear surfaces diverge outwardly, each at an angle which equals the angle at which said offset arm deflects at the location of said contact pad means when a predetermined load is applied to said contact pad means.

2. A shift fork for a vehicular transmission, as set forth in claim 1, wherein: the tangent of said angle is approximately equal to the deflection of the wear surface divided by the projected length of the offset arm through which said deflection is achieved.

3. A shift fork for a vehicular transmission, said shift fork comprising: a hub portion having a longitudinal axis; an offset arm oriented perpendicularly with respect to said longitudinal axis being connected with and extending radially outwardly from said hub portion to terminate in an outer end portion; contact pad means presented from said outer end portion of said offset arm to provide longitudinally facing wear surfaces; and, each of said longitudinally facing wear surfaces including an angularly inclined portion extending radially with respect to the longitudinal axis, said offset arm has a plane of symmetry disposed to include said longitudinal axis; tine means curve outwardly from said outer end portion of said offset arm portion to be transversely spaced with respect to said plane of symmetry; contact pad means are presented from said tine means to provide longitudinally facing wear surfaces; and, each said longitudinally facing wear surface having an angularly inclined portion extending radially with respect to the longitudinal axis, and said wear surfaces both diverge outwardly, each at an angle which equals the angle at which said tine means deflects at the location of said contact pad means on said tine means when said contact pad means on said tine means is subjected to a predetermined load.

4. A shift fork for a vehicular transmission, as set forth in claim 3, wherein: each said angularly inclined portion merges with a curvilinear portion at the radially outermost extent of said angularly inclined portion.

5. A shift fork for a vehicular transmission, as set forth in claim 4, wherein: the merger of said angularly inclined portion with said curvilinear portion is tangential.

6. A shift fork for a vehicular transmission, as set forth in claim 5, wherein: said curvilinear portion is arcuate.

7. A shift fork for a vehicular transmission, as set forth in claim 6, wherein: the tangent of said angle is approximately equal to the deflection of the war surface divided by the projected length through which said deflection is achieved.

8. A shift fork for a vehicular transmission, as set forth in claim 7, wherein: said tine means include first and second tines which curve outwardly from said outer end portion of said offset arm portion to be disposed in opposed, spaced relation; said contact pads supported from said opposed first and second tines present longitudinally facing, radially extending, angularly inclined wear surfaces; third contact pads are supported from the juncture of said first and second tines with said outer end portion of said offset arm; and, said third contact pads also present longitudinally facing angularly inclined wear surfaces extending radially with respect to the longitudinal axis.

9. A shift fork for a vehicular transmission, as set forth in claim 8, wherein: the tangent of the angle at which each wear surface is angularly inclined is approximately equal to the deflection of that wear surface divided by the projected length through which said deflection is achieved.

10. A wear element for a vehicular transmission shift fork comprising: a contact pad having a sagittal plane and a reference plane extending orthogonally with respect to said sagittal plane; a pair of oppositely directed, planar wear surfaces disposed in spaced relation laterally of said reference plane; and, said wear surfaces diverging outwardly from said reference plane.

11. A wear element, as set forth in claim 10, wherein: said planar wear surfaces each merge with a curvilinear surface.

12. A wear element, as set forth in claim 11, wherein: the merger of said planar wear surface and said curvilinear surfaces is tangential.

13. A wear element, as set forth in claim 12, wherein: said curvilinear surface is arcuate.

14. A method for determining the disposition of the wear surfaces on contact pads presented from the shift fork in a vehicular transmission, said method comprising the steps of: providing a shift fork that has a hub portion with an offset arm extending radially outwardly from the hub portion and from which contact pads are presented; fixedly positioning the hub portion; determining a representative loading that would be applied to the offset arm by the contact pads during operation of the vehicular transmission; applying the representative load to the contact pads of the shift fork which has the hub portion fixedly positioned; determining the deflection of the contact pads when subjected to said representative loading; determining the angular disposition of the contact pads as the tangent of an angle that is approximately equal to the deflection of the wear surface divided by the projected length of the offset arm through which said deflection is achieved; and, providing a wear surface on the contact pad that is inclined at the determined angular disposition.

15. A method, as set forth in claim 16, wherein a plurality of contact pads are provided at discrete locations relative to the offset arm and comprising the further steps of: determining the deflection of the offset arm at each discrete location at which a wear pad is supported; determining the angular disposition for each of the contact pads; and, providing a wear surface on each contact pad that is inclined at the determined angular disposition.

* * * * *

UNITED STATES PATENT AND TRADEMARK OFFICE
CERTIFICATE OF CORRECTION

PATENT NO. : 5,201,237
DATED      : April 13, 1993
INVENTOR(S) : John J. Berndtson and Robert C. Downs It is certified that error appears in the above-identified patent and that said Letters Patent is hereby corrected as shown below:

Title page, under item [19], change "Berndtson" to --Berndtson et al.--.

Title page, item [75], add --Robert C. Downs, Ortonville, Mich.--.

Signed and Sealed this

Eighth Day of March, 1994

Attest:

BRUCE LEHMAN

Attesting Officer     Commissioner of Patents and Trademarks